April 29, 1969 A. TURCZYN 3,441,919

PARTIAL SWITCHING OF A MAGNETIC ELEMENT

Filed March 31, 1966

INVENTOR
ALEXANDER TURCZYN

BY Rene A. Kuypers

ATTORNEY

United States Patent Office 3,441,919
Patented Apr. 29, 1969

3,441,919
PARTIAL SWITCHING OF A MAGNETIC ELEMENT

Alexander Turczyn, Philadelphia, Pa., assignor to Sperry Rand Corporation, New York, N.Y., a corporation of Delaware Filed Mar. 31, 1966, Ser. No. 539,140
Int. Cl. G11b *5/00*
U.S. Cl. 340—174 7 Claims This invention relates in general to a technique for switching a magnetic material from a first state to a second state. In particular, this invention relates to an arrangement for switching a magnetic thin film element from a first state to a second state in successive stages.

A recognized problem in the area of information transfer from a first memory location to a second memory location using the technique of bit current steering (i.e., the current developed during the read out of a first memory location steers the remanent magnetization of a second memory element in the same direction as the first memory element) is that the impedance of the transfer loop is sometimes too great to develop adequate steering power. By way of example, the impedance of a plated wire (the information transfer loop) increases as its length increases whereas the induced voltage obtained during the read out of a location along the wire remains constant. Hence, the steering current which is developed in the wire is insufficient to transfer information from a first location to a second location.

Accordingly, the following are deemed objects of the instant invention: to provide a new and improved method of transferring information from a first memory element to a second memory element; to provide a new and improved technique for transferring information from one location to another location along a magnetizable wire; to provide a technique for transferring information from one location to another location along a magnetizable wire where the inductance and resistance are relatively high. These and other objects will become more apparent as a full and complete description of the invention is made in the following paragraphs.

Figure 1:
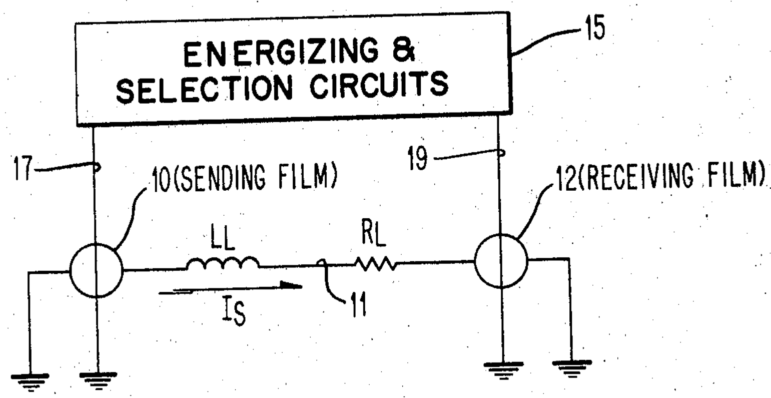
Figure 2:
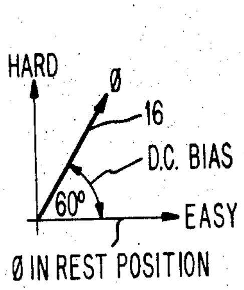
Figure 3:
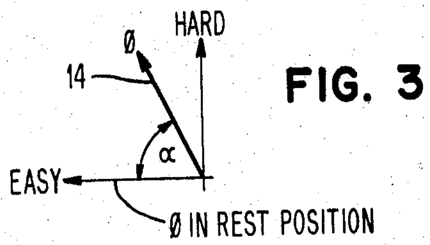
Figure 4:
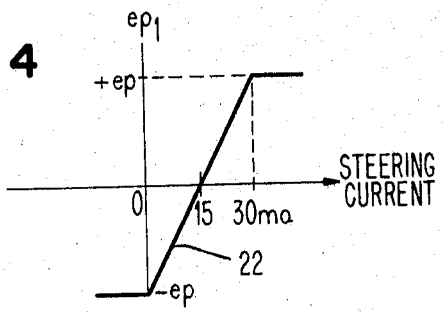
Figure 5:
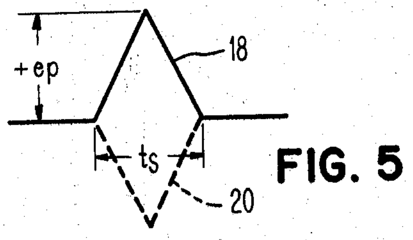
Figure 6:
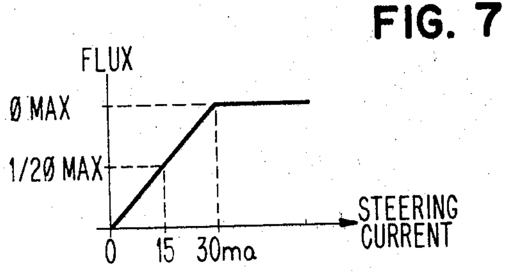
Figure 7:
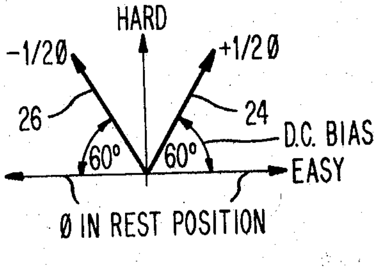

Referring now to the drawings, FIGURE 1 depicts a schematic arrangement for the transfer of information from a first memory element to a second memory element. FIGURE 2 shows the magnetization vectors relative to the easy and hard axis of magnetization of the second memory element when in a biased condition. FIGURE 3 depicts the magnetization vectors relative to the easy and hard axis of magnetization associated with the first memory element when the latter is being read out. FIGURE 4 is an idealized graph of the output voltage and the steering current for a plated magnetizable wire. FIGURE 5 is an idealized voltage output signal obtained during the read out of a memory location along a magnetizable wire. FIGURE 6 is an idealized graph between the steering current and the switched flux of a memory location along a magnetizable wire. FIGURE 7 represents the vector relationship obtained after the first partial switch in accordance with the technique provided by this invention.

The subject invention will be described hereinafter with respect to a plated magnetizable wire although it should be understood that the application may apply equally to any memory elements wherein a fraction of its total magnetization can be switched at a time.

The plated magnetizable wire (not shown) is conventionally a five mil beryllium-copper substrate upon which is coated a thin magnetizable film on the order of 10,000 angstroms. The thin magnetizable film is coated on the wire in the presence of a circumferential magnetic field thereby inducing in the coating the property of uniaxial anisotropy. Accordingly, the anisotropy induces a preferred or easy axis of magnetization around the circumference of the wire and substantially perpendicular to its longitudinal physical axis. A hard axis of magnetization is also obtained by the induced anisotropy which is 90 degrees removed from the easy axis. A binary "one" or a "zero" is recorded at specific locations along the magnetizable wire by orienting the magnetization of the coating in a clockwise or counterclockwise direction around the wire and along the easy axis of magnetization. By way of example, a "one" may be represented by a clockwise orientation around the easy axis and a "zero" by a counterclockwise orientation.

Referring to FIGURE 1 in greater detail, the memory elements 10 and 12 represent specific locations along the complete circuit loop 11. In the description which is to follow, the circuit loop 11 and the plated wire are used synonymously. For ease of understanding, the location 10 is called the sending film or first memory element. Location 12 along the plated wire 11 is designated as the receiving film or second memory element. The sending film 10 and the receiving film 12 may in practice be adjacent one another or separated by some significant distance. In order to obtain a complete circuit loop 11 for a magnetizable wire, both ends of the wire are terminated by grounding or with appropriate circuitry. In practice, the circuit loop 11 may be formed on a conductive ground plane and for a plated wire circuit loop, both ends thereof are connected thereto. For discrete memory elements such as planar thin films, both ends of a juxtaposed sense line to the films would be grounded. The complete circuit loop 11 provides a circuit path for the steering current $I_S$ which is developed during the information transfer process. The impedance of the steering loop of which sending film 10 and the receiving film 12 are part is represented by the lumped resistance parameter $R_L$ and the lumped inductance parameter $L_L$. The value of the resistance $R_L$ and the inductance $L_L$ is related to the length of the plated wire.

By referring to FIGURES 2 and 3 in conjunction with FIGURE 1 the technique of transferring information from a first memory location to a second memory location by means of bit steering will be briefly described. Thus, the receiving film is first biased or is placed in a condition to be switched by a steering current. Accordingly, the magnetization vectors represented by the magnetization vector 16 of the receiving film 12 are rotated to an angle of approximately 60 degrees. This is accomplished in a plated wire embodiment by energizing drive strap 19 adjacent the receiving film 12 with a D.C. bias or current pulse by means of the selection circuit 15. While the magnetization vectors are thus in a biased condition, the sending film 10 is energized by means of a second drive strap 17 via the selection circuit 15. When the strap 17 is energized, the magnetization vectors represented by the vector 14 (FIG. 3) are rotated to an angle less than 90 degrees thereby generating in the transfer loop 11 a steering current $I_S$. It should be noted that the information (represented by the vector 14) stored in the first memory location 10 is opposite from the information (represented by the vector 16) stored in the second location 12. Accordingly, if the magnitude of the steering current $I_S$ is of sufficient magnitude, the information which is recorded in the sending film 10 is transferred to the receiving film 12. In other words, the steering current $I_S$, when it is of sufficient magnitude, generates a magnetizing force which causes the magnetization vector 16 to rotate through the hard axis so that it assumes a quiescent orientation along the easy axis in the same direction as that of vector 14. Therefore, the information stored in the sending film 10 is transferred to the receiving film 12. However, in accordance with this invention, it is assumed that the impedance of the transfer loop 11 of the plated wire due to its resistance $R_L$ and its inductance $L_L$ is sufficiently great so that the steering current is not large enough to switch the receiving film 12. Accordingly, the technique of partial switching has been devised to permit information transfer from a first memory location to a second location where the impedance of the transfer circuit loop is large.

Referring now to FIGURES 4, 5 and 6 there are depicted current, voltage, and flux relationships for a magnetizable plated wire. Thus, FIGURE 4 shows an idealized relationship between the steering current and the output of a memory location along a plated wire. More particularly, FIGURE 4 shows the steering current required to switch from one polarity to another polarity and therefore shows the relative effectiveness of the steering current in a write operation. In other words, if a memory location is magnetized as a binary "0," it is assumed that it will produce a negative output voltage $-e_p$ (the signal 20 in FIG. 5) when it is energized during a read out cycle by a juxtaposed drive strap. FIGURE 4 shows that it is required to supply 30 milliamperes of steering current to change the remanent magnetization of a memory location from a binary "0" to a binary "1." When 30 milliamperes of steering current is supplied to a memory location during a write operation (assuming that it is properly conditioned) its magnetization will be switched. The memory location will thereafter produce a positive voltage $+e_p$ (the signal 18 in FIG. 5) when it is read out. FIGURE 4 also shows that during a write operation 15 milliamperes of steering current will in effect, switch one-half of the magnetization during an information transfer. Accordingly, when the memory element is read out during a read cycle, no output will be obtained since the one-half of magnetization will produce a positive voltage and one-half of the magnetization will produce a negative voltage and hence, the outputs will cancel.

FIGURE 6 is an idealized graph relating the amount of flux that can be switched with respect to the amount of steering current that is developed in the transfer loop 11 or plated wire. Thus, if the steering current has a magnitude of 30 milliamperes a full flux switch is obtained where as for only 15 milliamperes of steering current only one-half of the flux is switched. FIGURE 6 is thus consistent with FIGURE 4 in that FIGURE 6 shows that 30 milliamperes of steering current will switch the maximum amount of flux and thereby change the magnetization of the film (e.g., from a binary "0" to a binary "1").

Keeping in mind the plated wire memory characteristics discussed in FIGURES 4, 5 and 6 and as well as the information transfer arrangement in FIGURES 1, 2 and 3, the technique of writing using partial switching will now be discussed.

Since the inductance may be represented by the following formula, $$L \approx \frac{\Delta\phi}{\Delta i}$$

the characteristic of the plated wire memory element shown in FIGURE 6 demonstrates that the inductive load is constant during partial switching. In other words, the graph shown in FIGURE 6 demonstrates that the relationship between the switched flux and steering current is substantially linear and that for change of current there is a corresponding change of flux anywhere along the characteristic.

Referring now to FIGURE 1, the receiving film 12 represents an inductive load which may be expressed as $$L_R = \frac{\Delta\phi}{\Delta i} 10^{-8} \text{ henrys}$$

where $\Delta\phi$ is the change in the flux due to rotation of the magnetization vector 16 and $\Delta i$ is the steering current $I_S$ in the transfer loop 11 or plated wire.

Let us assume that the steering current $I_S$ (FIG. 1) in the plated wire 11 is too small to cause a complete switching of the receiving film 12 to the same remanent magnetization as that of the sending film 10. In operation, the magnetization vector 16 of the receiving film 12 is first biased to the approximately 60 degree position from the easy axis of magnetization (FIGURE 2). The magnetization vector 16 is therefore in a condition to be switched by a steering current developed in the plated wire. The magnetization vector 14 of the sending film 10 (FIGURE 3) is then energized to an angle $\alpha$ (less than 90 degrees from the easy axis). Due to the fact that the inductive load $L_R$, the inductance of the plated wire $L_L$ and its resistance $R_L$, is relatively large, only 15 milliamperes of steering current is generated in the circuit loop 11. By referring to FIGURE 6, it is evident that 15 milliamperes of steering current is only sufficient to switch one-half of the flux of the receiving film 12. In other words, the 15 milliamperes of steering current $I_S$ rotates the magnetization vector 16 (FIGURE 2) of the receiving film 12 to the hard axis of magnetization. Since the hard axis of magnetization is an unstable position, the magnetization vector 16 breaks up so that one-half of the vector 16 falls to the left of the hard axis and the remaining half to the right of the hard axis. Thus, after the first partial switching of the receiving element 12, the film breaks up into two even parts $+\phi/2$ and $-\phi/2$ and one-half of the information in the sending film 10 is transferred to the receiving film 12.

The above discussed partial switching of the receiving film 12 is shown in detail in FIG. 7. The magnetization vector 24 represents $+\phi/2$, whereas the vector 26 represents $-\phi/2$. It should be noted that in the quiescent or unenergized condition, the vector 24 will lie along the easy axis to the right of the hard axis and the vector 26 will lie along the easy axis to the left of the hard axis.

The second stage of the partial switching technique occurs in the following manner. The vectors 24 and 26 which now represent the information stored in the receiving film 12 (FIG. 1) are again biased to the 60 degree position by the strap 19. The strap 19 is energized by the selection circuit 15. The inductive load represented by the receiving film 12 may now be represented as follows:

$$L_R \approx \frac{\Delta\phi}{\Delta i} \approx \frac{\phi(\cos 60° - \cos 90°)}{15 \text{ ma.}} = \frac{\frac{1}{2}\phi}{15 \text{ ma.}}$$

The load inductance $L_R$ in the above formula relates the flux $\phi$, the steering current and the vector angle of rotation in the following manner. The flux represented by the vector 24 or 26 in FIGURE 7 is actually equal to the projection of either vector on the easy axis. Since the vectors 24 and 26 has a value $\phi/2$, the flux $\phi$ is multiplied by the quantity cos 60° (½) less cos 90° (0) or ½. By referring to FIGURE 6, it is readily seen that for a flux of $\phi/2$, a steering current $I_S$ of 15 milliamperes is required. Accordingly, the last mentioned formula represents the load inductance of the receiving film 12 and it is evident that 30 milliamperes of steering current are required for a full switch.

If it is assumed that the load inductance $L_R$ will remain substantially constant (as during the first partial switching) then the steering current $I_S$ will again be 15 milliamperes when the sending film 10 is energized by the strap 17 via the energizing and selection circuit 15. However, the angle of rotation of the magnetization vector 24 in FIGURE 7 is larger as can be seen by the formula below.

$$L_R = \frac{\phi}{2}\left(\frac{\cos 60° + \cos x°}{15 \text{ ma.}}\right) = \frac{\frac{1}{2}\phi}{15 \text{ ma.}}$$

where $$\cos x° = \tfrac{1}{2}$$

$$x = 60°$$

Thus, it can be seen that on the second switching of the film, the vector 24 or $+\phi/2$ rotates an additional 60 degrees from its 60 degree bias position and thus, the receiving film 12 is completely switched through the hard axis. Therefore, it can be readily seen that the information stored in the location 10 (the sending film) is transferred to the location 12 (the receiving film), in two stages and the vector 16 (FIG. 2) has the same easy axis orientation as the vector 14 (FIG. 3). It should be evident that the instant invention can readily transfer a "0" in a first location to a second location which is magnetized as a "1." Obviously, a transfer of "0" to a second location which is also magnetized as a "0" does not affect this "0."

In view of the above discussion, the following advantages of the invention become readily evident. One such advantage is that the parameters of the transfer loop 11 can be relaxed and a higher $R_L$ and $L_L$ can be tolerated. This permits a simpler mechanical fabrication since the mechanical requirements of the plated wire transfer loop (normally formed into a coaxial line) can be relaxed. Another advantage is that the requirements of the sending film can be relaxed and switching can be achieved with less steering current.

Information transfer by the technique of partial switching has been accomplished in two stages as discussed above. It should be understood, however, that the technique of partial switching may be accomplished in several stages as long as there is some partial switching in the first stage.

Obviously many modifications and variations of the present invention are possible in the light of the above teachings. It is therefore to be understood that within the scope of the appended claims, the invention may be practiced otherwise than specifically described.

The embodiments of the invention in which an exclusive property or privilege is claimed are defined as follows:

1. The combination comprising:

(a) first and second data storage elements, the information which is stored in said elements being indicated by a remanent state of magnetization, (b) means linking said first and second data storage elements to one another, (c) second energizing means coupled to said second data storage element to condition said second data storage element to change or in the alternative to retain its remanent state of magnetization, (d) first energizing means coupled to said first data storage element, said last mentioned means being energized at least twice in succession while said second data storage element is conditioned, each said successive energizing of said first data storage element inducing a signal in said means linking said first and second data storage elements, (e) the remanent state of magnetization of said second data storage element being partially changed or in the alternative retained by each said induced signal, (f) the information stored in said first data storage element being thereby transferred to said second data storage element.

2. The combination in accordance with claim 1 wherein said first and second data storage elements are magnetizable film elements.

3. The combination in accordance with claim 1 wherein said first and second data storage elements comprise first and second locations on a magnetizable wire having an easy and hard direction of magnetization, the magnetization vectors at said first and second location being normally oriented along said easy axis.

4. The combination in accordance with claim 3 wherein the magnetization vectors of said second location along with said magnetizable wire are conditioned by being rotated to an angle less than 90 degrees.

5. The combination in accordance with claim 3 wherein said information is transferred along said magnetizable wire from said first location to said second location by successively biasing said magnetization vectors at said second location to an angle less than 90 degrees by means of said second energizing means after which a steering current is induced in said magnetizable wire by reading out the information stored in said first location by means of said first energizing means.

6. The combination in accordance with claim 3 wherein said magnetizable wire comprises a copper beryllium substrate having a magnetic coating with the property of uniaxial anisotropy.

7. The combination in accordance with claim 3 wherein said magnetizable wire has a diameter on the order of 5 mils.

References Cited

UNITED STATES PATENTS 3,357,000 12/1967 Tickle ............. 340—174

BERNARD KONICK, *Primary Examiner.*

S. POKOTILOW, *Assistant Examiner.*